April 28, 1959　　M. G. WHITEHEAD　　2,883,923
BARBECUING APPARATUS

Filed Sept. 22, 1955　　3 Sheets-Sheet 1

INVENTOR.
MERL G. WHITEHEAD
BY m. a. Hobbs
ATTORNEY

April 28, 1959     M. G. WHITEHEAD     2,883,923
BARBECUING APPARATUS

Filed Sept. 22, 1955     3 Sheets-Sheet 2

INVENTOR.
MERL G. WHITEHEAD
BY *M. A. Hobbs*
ATTORNEY

United States Patent Office 2,883,923
Patented Apr. 28, 1959

2,883,923

BARBECUING APPARATUS

Merl G. Whitehead, Goshen, Ind.

Application September 22, 1955, Serial No. 535,973

4 Claims. (Cl. 99—427)

The present invention relates to an apparatus for preparing food and more particularly to an apparatus for barbecuing or broiling meat.

One of the principal objects of the present invention is to provide a power driven apparatus for barbecuing or broiling meat wherein a number of pieces of meat may be simultaneously turned so that all sides will be subjected to the heat substantially uniformly to automatically baste the meat while it is being cooked over an open fire.

Another object of the invention is to provide an apparatus for barbecuing or broiling a number of pieces of meat simultaneously, wherein the meat is turned automatically and the pieces of meat can be removed as they become done without interrupting the operation of the apparatus in respect to the pieces of meat still being cooked.

Still another object of the invention is to provide a relatively simple compact barbecuing or broiling apparatus which can easily be moved from one location to another and which does not require the services of any skilled person to handle the meats in the barbecuing operation.

Another object is to provide an apparatus for automatically barbecuing a number of relatively small pieces of meat such as chicken, wherein meats at various stages of preparation can be handled simultaneously and the cooked meat removed and uncooked meat inserted without interrupting the operation of the apparatus.

A further object of the invention is to provide a barbecuing or broiling apparatus the effective size and/or capacity of which can be varied to suit the requirements at a barbecue, picnic, party or other gathering.

Additional objects and advantages of the present invention will become apparent from the following description read in conjunction with the accompanying drawings, wherein.

Figure 1:
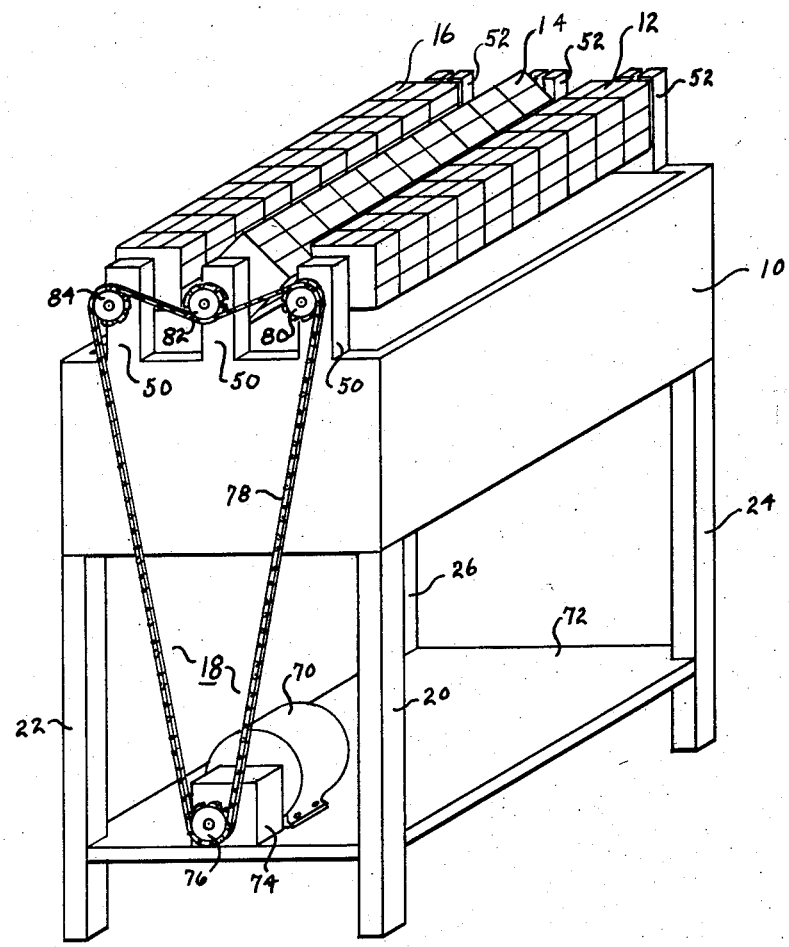
Figure 1 is an oblique view of my meat barbecuing and broiling apparatus, showing the operative relationship of the various parts.
Figures 3, 4:
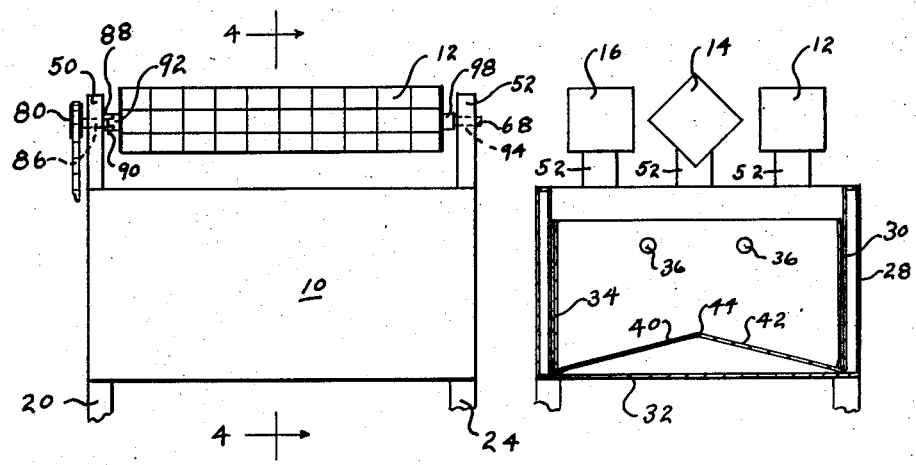
Figure 3 is a side elevation of my barbecuing apparatus, in which the lower portion has been omitted.
Figure 4 is a cross sectional view of the apparatus taken on line 4—4 of Figure 3.

Referring more specifically to the drawings and to Figure 1 in particular, numeral 10 designates a fire pit, numerals 12, 14 and 16 designate basket-like rotatable meat holders, and 18 indicates a power mechanism for driving the three rotatable meat holders. The fire pit shown in detail in Figure 4 is supported by four legs 20, 22, 24 and 26 and consists of an outside wall 28, an inside wall 30 spaced from said outside wall to provide space for insulating material such as fibre glass or rock wool. The walls rest on and are secured to a flat plate like bottom 32 which in turn is secured by welding or other suitable means to the upper end of the four legs. The walls and bottom are preferably constructed of sheet metal or plate steel and if desired the inside surfaces of wall 30 and the bottom may be lined with ceramic material or other fire and heat resistant material. To facilitate starting a fire in the pit and removing the ashes therefrom, a removable fire pan 34 is preferably placed in the pit to hold the fuel such as charcoal. When the apparatus is to be placed in operation, the fire pan is removed from the pit, the charcoal placed in the bottom of the pan, ignited and permitted to burn until a good bed of coals is obtained. The pan is then placed in the pit ready for operation. Holes 36 are provided in each end of the pan for tongs or the like for use in inserting and removing the pan. The bottom of the pan is divided into two sections 40 and 42 sloping away from a longitudinal center ridge 44, to provide troughs along each side of the pan for the coals, leaving the center of the bottom uncovered. This distribution of the coals gives substantially equal and uniform heat to all three meat holders.

Figure 6:
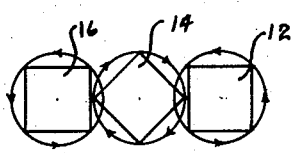
Figure 6 is a diagrammatic view of the meat holding means, showing an arrangement for obtaining compactness in the barbecuing apparatus.

Meat holders 12, 14 and 16 are supported above the fire pit on members 50 at the driven end of the holders and on members 52 on the idling end of the holders, said members being rigidly secured to the upper edge of the end sections of the fire pit walls. The holders are evenly spaced side by side above the pit and, to conserve space and make the apparatus as compact as possible, are preferably arranged as shown in Figure 6. The position of the holders as shown in the figure permits the holders to be located as close as possible without bumping each other during rotation. To obtain satisfactory operation of the apparatus with this arrangement, rotation of the holders must be synchronized so that the sides of the two end holders are vertical as the sides of the center holder are positioned at a 45 degree angle.

Figures 2, 5:
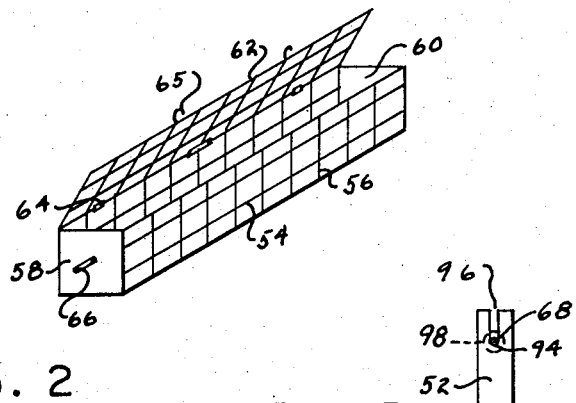
Figure 2 is an oblique view of one of the meat holding means shown in Figure 1.
Figure 5 is a detailed view of a support of the meat holding means shown in the preceding figures.

The holders as shown in Figure 2 consist of spaced longitudinal and transverse rods or wires 54 and 56 respectively, welded together to form a rigid structure which is supported at its ends by rigid metal plates 58 and 60 to which the ends of the longitudinal rods are secured. A lid 62 of the same general construction as the sides closes the top of the holder and is pivoted along one side by three hinges 64 and fastened along the other side when closed by latches 65. Shafts 66 and 68 are rigidly secured to the center of plates 58 and 60, respectively, and form the axis on which the holders rotate.

The meat holders are rotated by an electric motor 70, mounted on a platform 72 beneath the fire pit, through a speed reducing mechanism 74, gear 76, chain 78 and gears 80, 82 and 84 for operating holders 12, 14 and 16, respectively. The speed reducing means is preferably of the variable speed type so that the speed of the holders can be varied for different cooking conditions. Any well known variable speed type is satisfactory. The chain passes over gear 80, under gear 82 and over gear 84 thus causing holder 14 to rotate in the opposite direction from holders 12 and 16, as shown in Figure 6. Since the construction of the drive mechanism for one meat holder is the same as those for the other holders, only one will be described in detail. Gear 80 is mounted on and secured to a shaft 86 which is journalled in a bearing in member 50 and held from endwise movement by a collar 88 of a coupling 90 secured to the end of said shaft on the opposite side of member 50. A second collar 92 which keys with collar 88 is secured on shaft 66 and permits the meat holder to be easily removed from its place over the fire pit.

Shaft 68, which is secured to the end of the meat holder opposite the driving mechanism, is supported by and rotates in a half bearing 94 in member 52. The upper half of the bearing is removed to form a slot 96 into which shaft 68 is placed when the meat holder is inserted in the machine. The portion of shaft 68 between the bearing and plate 60 is enlarged to form an annular shoulder 98 for abutting against the inside surface of member 52, thus preventing the holder from moving endwise and the coupling from becoming uncoupled while the holder is in operation. When it is desired to remove a particular holder, it is lifted until shoulder 98 clears member 52 and is then moved longitudinally away from the driving mechanism until it is uncoupled.

In the operation of the foregoing barbecuing apparatus, a fire is started and a good bed of coals is obtained in the fire pan. The pan is then placed in the fire pit and one or more meat holders are filled with meat such as pieces of chicken and placed in operation over the pit. It may be desirable to start one of the holders and then wait a period of time before starting the second holder and still a longer period of time before starting the third in order to have meat ready for serving throughout an entire barbecue, picnic or the like. As the meat is served from one holder it is refilled and again placed in operation over the pit. After the first holder is mounted in place over the hot coals in the pit the motor is started so that the meat will be continuously turned while it is broiling, and by selecting the proper speed, by changing the speed of the motor or the speed reducing mechanism, satisfactory basting of the meat can be obtained without any of the meat juices dripping into the fire. Although the rotation of the holders will be realtively slow throughout their operation, to obtain the most satisfactory results the speed should be varied within limits as the heat given off by the fire in the pit varies, i.e. as the temperature increases and decreases the speed of the holders should be increased and decreased, respectively; however, minor variations in temperature do not require a change in speed.

Figure 7:
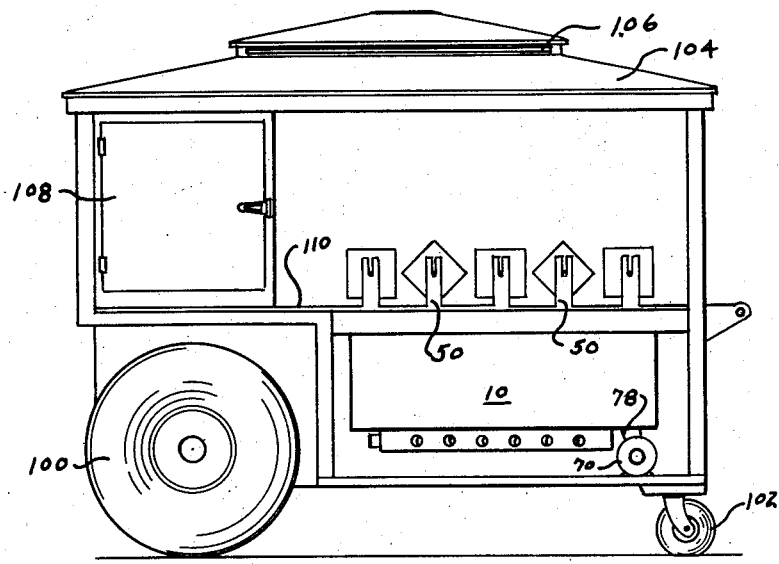
Figure 7 is a front elevational view illustrating one embodiment of my portable barbecuing apparatus.

In Figure 7 a portable barbecue is shown wherein a firepit and meat holders similar in construction to the one prevoiusly described is mounted in a wagon having two large wheels 100 at one end and casters 102 at the other end to give the wagon good maneuverability. The wagon would normally be enclosed with glass on three sides and left open on the front as shown. The roof 104 is provided with a vent 106 to permit the fumes from the fire to escape. In this embodiment of the barbecue apparatus, five meat holders are employed instead of three and the holders are mounted as close as possible to one another and their operation synchronized as illustrated in Figure 6. The details of the apparatus will not be described here since it is basically the same as the other unit described herein and the same numerals where applicable have been used. Preferably in this embodiment, adjustable air inlets are provided in the bottom of the pit to permit air to flow around the fire pan to supply air to the fuel therein. Food preparing and storing facilities, such as the refrigerator or holding oven shown at numeral 108 and a work space 110, may be provided to facilitate preparation of the meat for barbecuing and serving.

Figure 9:
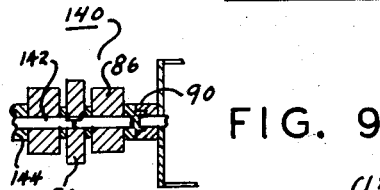
Figure 9 is a detailed cross sectional view of power transmission mechanism for driving the multiple unit assembly shown in Figure 8.
Figure 8:
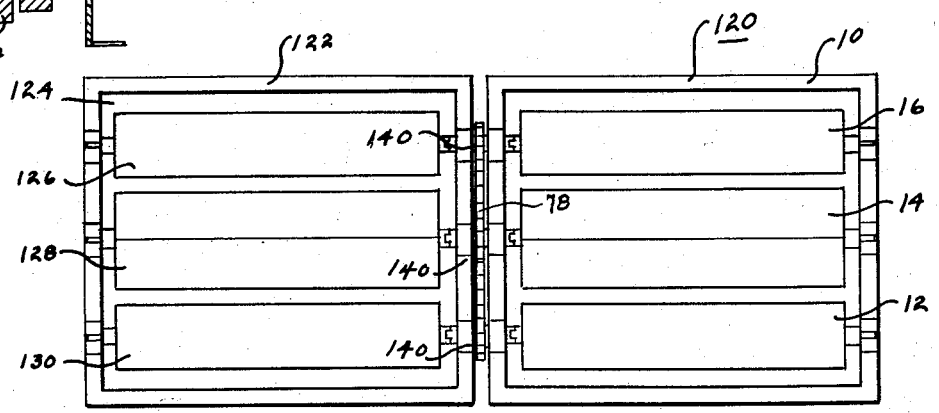
Figure 8 is a top plan, partial schematic view of a multiple unit assembly, which can be varied in capacity as requirements and demand vary.

In Figure 8, numeral 120 designates a unit of substantially the same construction and operation as that shown in Figure 1 and numeral 122 designates an auxiliary unit having a fire pit 124 and holders 126, 128 and 130 mounted over the pit in the same manner as the holders of Figure 1 are mounted over pit 10. The principal difference between units 120 and auxiliary unit 122 is that the latter does not have its own power driving mechanism. The mechanism for rotating the meat holder of unit 122 is driven by the power driving mechanism of unit 120 through one or more transmissions 140 shown in detail in Figure 9. Using numerals corresponding to those used in the previous figures where applicable, holders 16 and 126 are driven by gear 84 through shafts 86 and 142 and couplings 90 and 144, respectively. A chain passing alternately over and under the gears for the various holders of the two units and thence to the gear on the speed reducing mechanism drives and synchronizes the rotation of the holders.

Various changes can be made in my barbecuing apparatus without departing from the scope of the invention. For example, instead of using the basket type meat holders, rotating spits or clamps can be used, and a larger or smaller number of meat holders than those shown in the two embodiments can be employed. Further the type of drive mechanism shown may be replaced by individual motors for each meat holder or by a shaft having a worm and gear for each holder. Also adjustable means such as folding or screw type legs can be mounted on the bottom of fire pan 34 to vary the height of the pan in relation to the meat holders.

I claim:

1. An apparatus for cooking meat, comprising a fire pit for coals having a longitudinal ridge with gradually sloping sides in the bottom thereof extending to the outside edges of the pit for dividing the fire into two sections, three rotatable basketlike meat holders of rectangular cross sections mounted above said pit in parallel relation to said ridge, axially aligned shafts on each end of said holders, bearing means at each end of said holders for rotatably supporting said shafts, the corresponding bearing of each holder having an opening in the upper side thereof to permit the respective shaft to be lifted and inserted in said bearing while the holder is rotating, the spacing of said holders being such that continuous rotation is only possible by positioning every other holder at substantially a 45 degree angle of rotation from the adjacent holders, and power means for rotating said holders.

2 An apparatus for cooking meat, comprising a fire pit for coals having a longitudinal ridge with gradually sloping sides in the bottom thereof extending to the outside edges of the pit for dividing the fire into two sections, a plurality of rotatable basket-like meat holders of rectangular cross section mounted above said pit in parallel relation to said ridge, axially aligned shafts on each end of said holders, bearing means at each end of said holders for rotatably supporting said shafts, the spacing of said holders being such that continuous rotation is only possible by positioning every other holder at substantially a 45 degree angle of rotation from the adjacent, and power means for rotating said holders.

3. An apparatus for cooking meat, comprising a fire pit for coals having a longitudinal ridge with gradually sloping sides in the bottom thereof extending to the outside edges of the pit for dividing the fire into two sections, a plurality of rotatable basket-like meat holders of rectangular cross section mounted above said pit in parallel relation to said ridge, the spacing of said holders being such that continuous rotation is possible only by positioning every other holder at substantially a 45 degree angle of rotation from the adjacent holders, and power means for rotating said holders.

4. An apparatus for cooking meat, comprising a fire pit for coals having a longitudinal ridge with gradually sloping sides in the bottom thereof for dividing the fire into two sections, a plurality of rotatable basket-like meat holders mounted above said pit in parallel relation to said ridge, and power means for rotating said holders.

(References on following page)

References Cited in the file of this patent

UNITED STATES PATENTS

| | | |
|---|---|---|
| 1,491,945 | Clement | Apr. 29, 1924 |
| 1,704,621 | Matiska | Mar. 5, 1929 |
| 1,954,542 | Scheu | Apr. 10, 1934 |
| 2,020,446 | Weisel | Nov. 12, 1935 |
| 2,125,965 | Sturm | Aug. 9, 1938 |
| 2,198,134 | Spiegl | Apr. 23, 1940 |
| 2,253,434 | Kernick | Aug. 19, 1941 |
| 2,494,448 | Nassif | Jan. 10, 1950 |
| 2,541,528 | McAvoy | Feb. 13, 1951 |
| 2,552,861 | Overman | May 15, 1951 |